J. GROAT.
Grist Mill.
No. 3,659
2 Sheets.—Sheet 1.
Patented July 11, 1844.
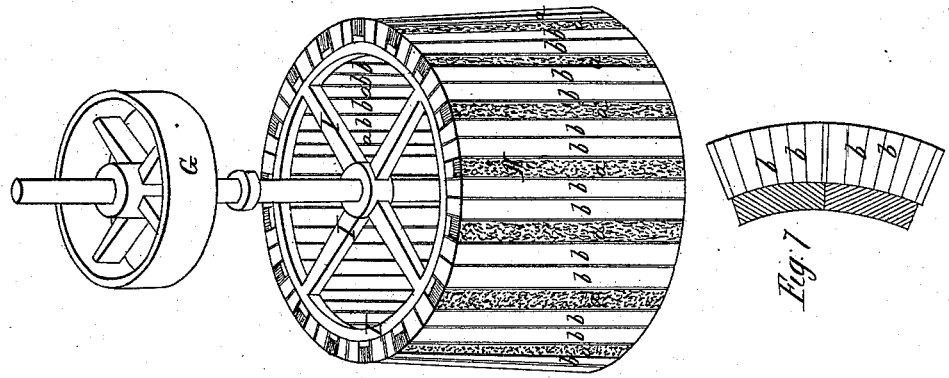
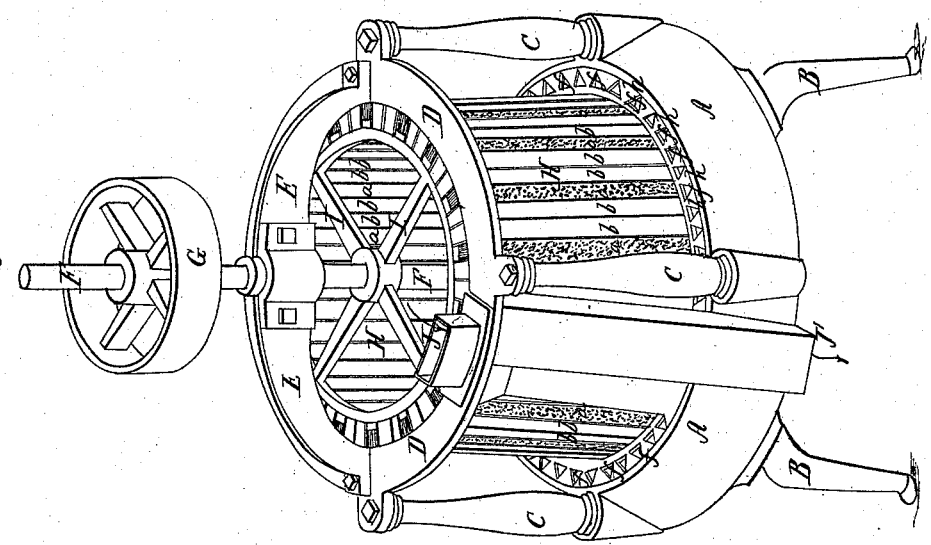
Witnesses;
Paul R. Hodge
Thos. B. Barnard
Inventor;
Jacob Groat J. GROAT.
Grist Mill.

No. 3,659

2 Sheets.—Sheet 2.

Patented July 11, 1844.

UNITED STATES PATENT OFFICE.

JACOB GROAT, OF TROY, NEW YORK.

MACHINE FOR HULLING AND PEARLING RICE.

Specification of Letters Patent No. 3,659, dated July 11, 1844.

*To all whom it may concern:*

Be it known that I, JACOB GROAT, of the city of Troy, in the county of Rensselaer and State of New York, have invented certain new and useful Improvements in Machines for Hulling and Pearling Rice, &c.; and I do hereby declare that the following is a full, clear, and exact description thereof, reference being had to the accompanying drawings, maging a part of this specification, in which—

Figure 1 of drawing No. 1, is a perspective elevation of the machine, the outer casing being omitted to show the inside cone or runner.

Figure 3:
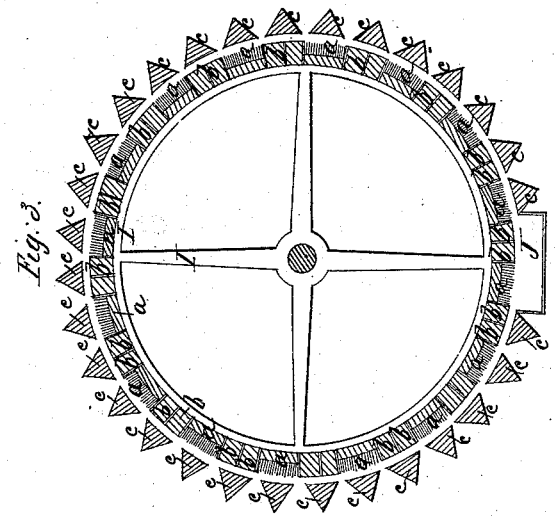

The revolving cone may have its exterior surface at the periphery covered with strips of gum elastic cloth alternated with thin strips of iron, or it may be covered with strips of gum elastic (*b*) alternated with the thin pieces of iron, and between the ribs or strips formed of gum elastic and iron the cone is interribbed with brushes (*a*). Fig. 2, No. 1, shows more distinctly the revolving cone, it being in that figure detached from the case. Fig. 3, No. 2, is a horizontal section of the case and revolving cone, showing the position of the triangular files (*c*) in relation to the alternate ribs, or staves, of gum elastic and brushes; the cross section of these files form an equilateral triangle one side of which faces the revolving cone.

The machine is constructed thus: A ring or base of cast iron A, A, is supported on four legs B, two of which only are shown in the drawing. This ring A has a groove cut in its upper surface wide enough, and of sufficient diameter, to receive the lower ends of the files forming the sides of the case. A similar top ring D, D, of smaller diameter than A is supported over it on pilling C, C, to which it is bolted.

E E is a cross bar, in which the upper bearing of the shaft F of the revolving cone is situated. It is fastened across from one side to the other of the ring D and curves upward.

G is the driving pulley situated above the bearing in E, on the shaft F.

The cone H, which revolves, is composed of two cast iron wheels I, I, having arms in them by which they are connected with the shaft. The lower of these two rings is enough larger that the top one to conform to the conical shape of the case. To these wheels, or heads are affixed the staves of gum elastic and brushes before named by bolts or screws. These staves are a prominent feature of my improvements. Those marked (*a*) are brushes with wooden backs, the brush part being formed of any suitable material of which stiff brushes can be made. The staves (*b*) are made of gum elastic, or of a composition similar to that patented by C. Geedyear on the 15 June 1844 of which gum elastic is a constituent part. This is laid edgewise and fastened to the staves as will readily be understood by the workman. The revolving cone is thus covered as shown in drawing No. 2, Fig. 3, with staves of brushes alternated with two consecutive ones of gum elastic or composition, between which last, a thin strip of sheet iron is interposed.

Figure 4:
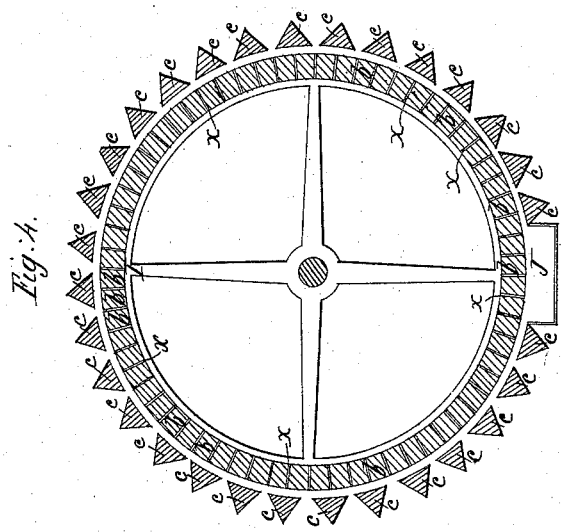

Drawing No. 2, Fig. 4, shows the horizontal section of a revolving cone, formed wholly of gum elastic, or composition staves (*b*) with thin strips of sheet iron (*x*) intervening.

The horizontal section of the files forming the sides of the case are shown in the two last named Figs. 3 and 4, in their proper position around the case, and are lettered (*c, c.*) These files are inserted in the grooves in the rings A and D, above named and are held in their places by means of small triangular pieces of soft metal marked (*h*), Fig. 1. The grooves are turned a little mitering so that when the soft metal is driven in it holds firmly. The distance between the files, which form the apertures for discharging the dirt, can be regulated as follows: If the files are too near to each other, the metal (*h*) is driven in hard enough to separate them a proper distance commencing at one side next to the space J (see Fig. 3) and going around. If they are to be set closer, the files must be driven up together commencing on one side and going around as before.

The space J is for conveying grain into the machine, and discharging it from it; it is furnished with two spouts as represented at Fig. 1, and the arrows indicate the course of the grain, to and from the machine.

Now it will be obvious that when the rice is conveyed into the machine through the spout J, Fig. 1, it will be carried around by the revolving cone, and acted on alternately by the brushes and gum elastic, and will be discharged beside the tube of entrance below at J′.

In the first process of hulling rice I use the cone covered with gum elastic and iron in the second process of pearling and polishing, the cone covered with alternate staves of gum elastic and brushes, is preferable to finish with.

Having thus fully described my machine for hulling, and pearling rice, &c., what I claim therein as my invention and for which I desire Letters Patent is—

1. Constructing the revolving cone in the manner described with alternate staves of brushes and gum elastic and iron or gum elastic and strips of iron alone, combined and operating in the manner and for the purpose herein set forth.

2. I claim in combination with the above named revolving cone a case formed of triangular shaped files as above fully made known.

3. I claim the method of combining the files with the upper and lower rings so as to be adjustable in the manner before described by inserting them in a groove with soft pieces of metal between them by means of which they may be driven closer together or separated as occasion requires.

JACOB GROAT.

Witnesses:
J. J. GREENOUGH,
J. DOOLITTLE.